United States Patent [19]
Resnick et al.

[11] Patent Number: 5,823,319
[45] Date of Patent: Oct. 20, 1998

[54] CONTROL SYSTEM FOR THE DROP-OUT ZONE OF A CONSTANT SPEED ACCUMULATING CONVEYOR

[75] Inventors: Brian J. Resnick, Mount Orab; Raymond R. Neiser, Batavia Township, both of Ohio

[73] Assignee: The Buschman Company, Cincinnati, Ohio

[21] Appl. No.: 644,857

[22] Filed: May 10, 1996

[51] Int. Cl.$^6$ .................................................. B65G 13/06
[52] U.S. Cl. ................. 198/781.06; 198/781.04
[58] Field of Search .................... 198/781.01, 781.04, 198/781.05, 781.06, 781.08, 460.1

[56] References Cited

U.S. PATENT DOCUMENTS

| | | | |
|---|---|---|---|
| 3,960,262 | 6/1976 | Henig | 198/781.06 X |
| 4,103,769 | 8/1978 | Jorgensen | 198/781.04 |
| 4,383,605 | 5/1983 | Harwick | 198/781.06 |
| 4,453,627 | 6/1984 | Wilkins . | |
| 4,473,149 | 9/1984 | Vogt et al. | 198/781.04 |
| 4,721,203 | 1/1988 | Kimball et al. | 198/781.01 X |
| 5,375,696 | 12/1994 | Collins et al. | 198/781.04 |

OTHER PUBLICATIONS

Uni–Com® Power Conveyor Brochure, The Buschman Company, Cincinnati, Ohio, issued Jul. 1993.

*Primary Examiner*—James R. Bidwell
*Attorney, Agent, or Firm*—Frost & Jacobs

[57] ABSTRACT

A control system for a conveyor system of the type having a first constant speed conveyor with a drop-out zone and a second variable speed downstream conveyor receiving products from the drop-out zone. The drop-out zone comprises a plurality of conveyor rollers driven by a drive mechanism operated by a constant speed prime mover assembly. An actuator engages and disengages the drive mechanism with the drop-out zone rollers. The control system has a processing circuit configured to ascertain the velocity of the downstream conveyor and configured to match the effective velocity of the first conveyor drop-out zone to that of the downstream conveyor by use of a periodic varying duty cycle signal that controls the actuator via an output device in communication with the processing circuit. The processing circuit also varies the ON-time and OFF-time of the varying duty cycle signal to automatically control energizing of the output device to accomplish the velocity match. The processing circuit is also capable of changing the period of the duty cycle signal when required.

16 Claims, 5 Drawing Sheets

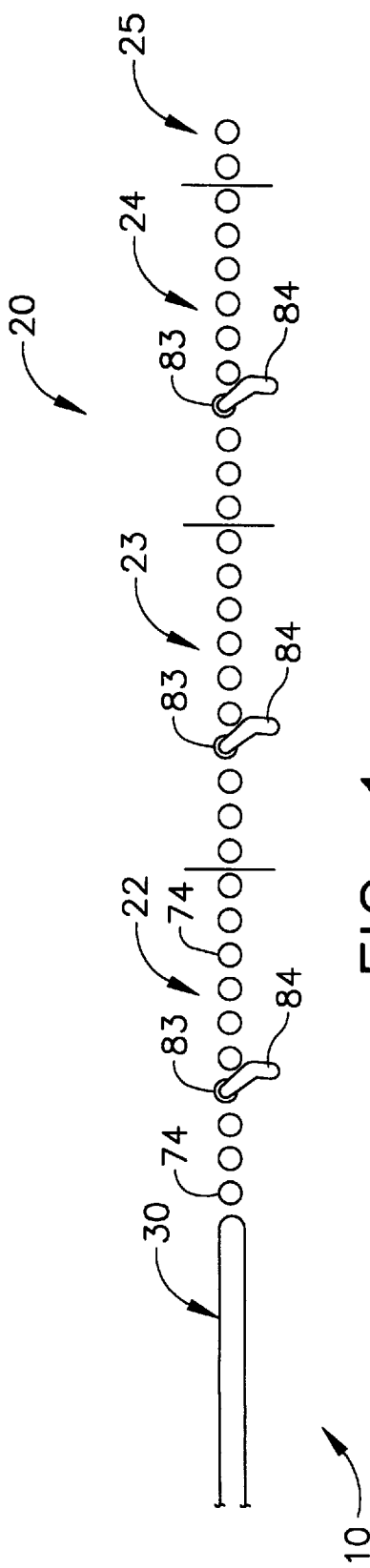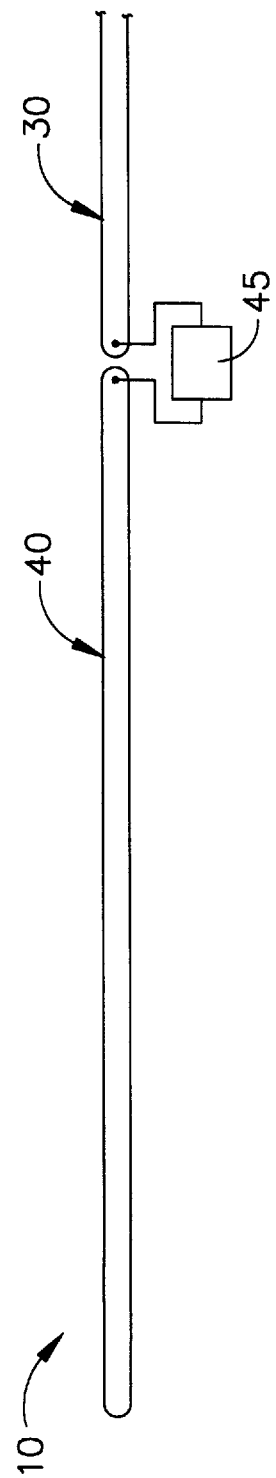

CONTROL SYSTEM FOR THE DROP-OUT ZONE OF A CONSTANT SPEED ACCUMULATING CONVEYOR

TECHNICAL FIELD

The invention relates to a control system for a constant-speed accumulating conveyor, and more particularly to such a control system that matches the effective release speed of the drop-out zone of the accumulating conveyor to the speed of its immediate downstream conveyor.

BACKGROUND ART

There has long been a problem that, when a conveyor such as an accumulating conveyor runs at a higher velocity than the downstream conveyor it is feeding, the accumulating conveyor tends to push products such as cartons or the like onto the belt conveyor. This places the cartons under pressure, with the result that the cartons tend to be buckled and skewed on the downstream conveyor. This problem is not as acute with large packages as it is with smaller packages.

The prior art has taken various approaches to this problem. One approach was simply to run the accumulating conveyor at its normal speed and count on slippage on the conveyor rollers to minimize the problem. Another approach was to use a variable speed motor controller to slow the chain drive of the entire accumulating conveyor, essentially converting the entire accumulating conveyor into a variable-speed drive conveyor. Yet another approach has been to provide a constant velocity accumulating conveyor and run the discharging zone or drop-out zone thereof at some fixed duty cycle such as 75% duty cycle, thus converting the drop-out zone into a slower constant speed conveyor, with no real attempt to match the drop-out zone velocity with the velocity of the downstream conveyor being fed by the accumulating conveyor.

The present invention is based upon the fact that the rollers of the drop-out zone of the accumulating conveyor can be controlled separately from the rollers of the other zone or zones of the accumulating conveyor such that the drop-out zone can be controlled to provide an effective release velocity that will closely approximate that of the downstream conveyor fed thereby.

DISCLOSURE OF THE INVENTION

According, it is a primary object of the present invention to provide a constant speed accumulating conveyor with a drop-out zone that has an effective variable speed capability so as to provide a release velocity that automatically matches the velocity of a variable speed downstream conveyor.

It is another object of the present invention to provide this capability without the requirement of additional hardware.

It is a further object of the present invention to implement this capability by controlling the duty cycle of the actuator of the drive mechanism for the drop-out zone.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved control system and method are provided that give an additional capability to a conventional constant-speed accumulating conveyor that includes a drop-out zone. This additional capability provides the drop-out zone with an effective variable-speed function that can be automatically controlled by the control system. In a conveyor system that includes a variable-speed downstream conveyor, it is desirable to transfer items (e.g., cartons) from the drop-out zone at substantially the same velocity as the present operating velocity of the downstream conveyor. The automatic control capability of the present invention makes it possible to match the velocities of both the drop-out zone and downstream conveyor without having to add further hardware to the conventional constant-speed accumulating conveyor.

In one preferred embodiment, the accumulating conveyor comprises a roller conveyor divided into zones, the rollers of each individual zone being driven by its own drive mechanism which includes a plurality of friction wheels shiftable between a roller contacting, driving position and a retracted position. In this preferred embodiment, all of the accumulating conveyor's drive mechanisms are driven by a single constant-speed prime mover and drive chain. Each of the individual zones' drive mechanism is operated by an actuator which comprises multiple air-powered diaphragms, an air valve, and a valve switching device. For at least the drop-out zone, the switching device is electrically operated and energizes its own air valve to shift said drop-out zone's drive mechanism to said roller contacting, driving position during an "ON-time" interval and de-energizes this air valve during a corresponding "OFF-time" interval to shift said drive mechanism to said retracted position, during each period of a periodic (i.e., repeated) varying duty cycle signal produced by a processing circuit such as a computer or a programmable logic controller.

By controlling the ON-time and OFF-time intervals to appropriately either speed up or slow down the drop-out zone, the controller of the present invention can automatically substantially match this drop-out zone's velocity with that of the adjacent downstream conveyor, thereby achieving the primary object of the present invention. Since the mechanical devices that make up the actuator for the drop-out zone (e.g., the diapharagms and air valve) require significant amounts of activation and de-activation "reaction" times before they can physically operate, the controller's processing circuit preferably provides that each ON-time and OFF-time interval be required to be of pre-determined minimum time intervals that are at least as long as these reaction times.

To achieve a relatively quick responsiveness for the conveyor system, it is desirable to cause the time interval for each of the periods (comprising one ON-time interval plus one OFF-time interval) of the periodic variable duty-cycle signal to be as short as possible. However, since each individual ON-time and OFF-time interval cannot be decreased below the above-related pre-determined minimum time intervals, the control system preferably will increase the length of the period to accomodate duty cycle values that would otherwise require either an ON-time or OFF-time interval that would fall below the pre-determined minimums. In the above preferred embodiment, the shorter of the ON-time and OFF-time intervals needed to create a particular duty cycle would be selected to be set equal to the value of the appropriate pre-determined minimum time interval, and the longer of these time intervals (i.e., either the ON-time or the OFF-time) would be correspondingly determined.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 1a is a fragmentary, simplified, diagrammatic representation of a conveyor system to which the teachings of the present invention may be applied.

FIG. 1b is a fragmentary, simplified, diagrammatic view of the rest of the conveyor system of FIG. 1a.

FIG. 2 is a fragmentary, simplified, elevational view, partly in cross-section, of the drop-out zone of the accumulating conveyor of FIG. 1a.

DETAILED DESCRIPTION OF THE INVENTION

Figure 2:
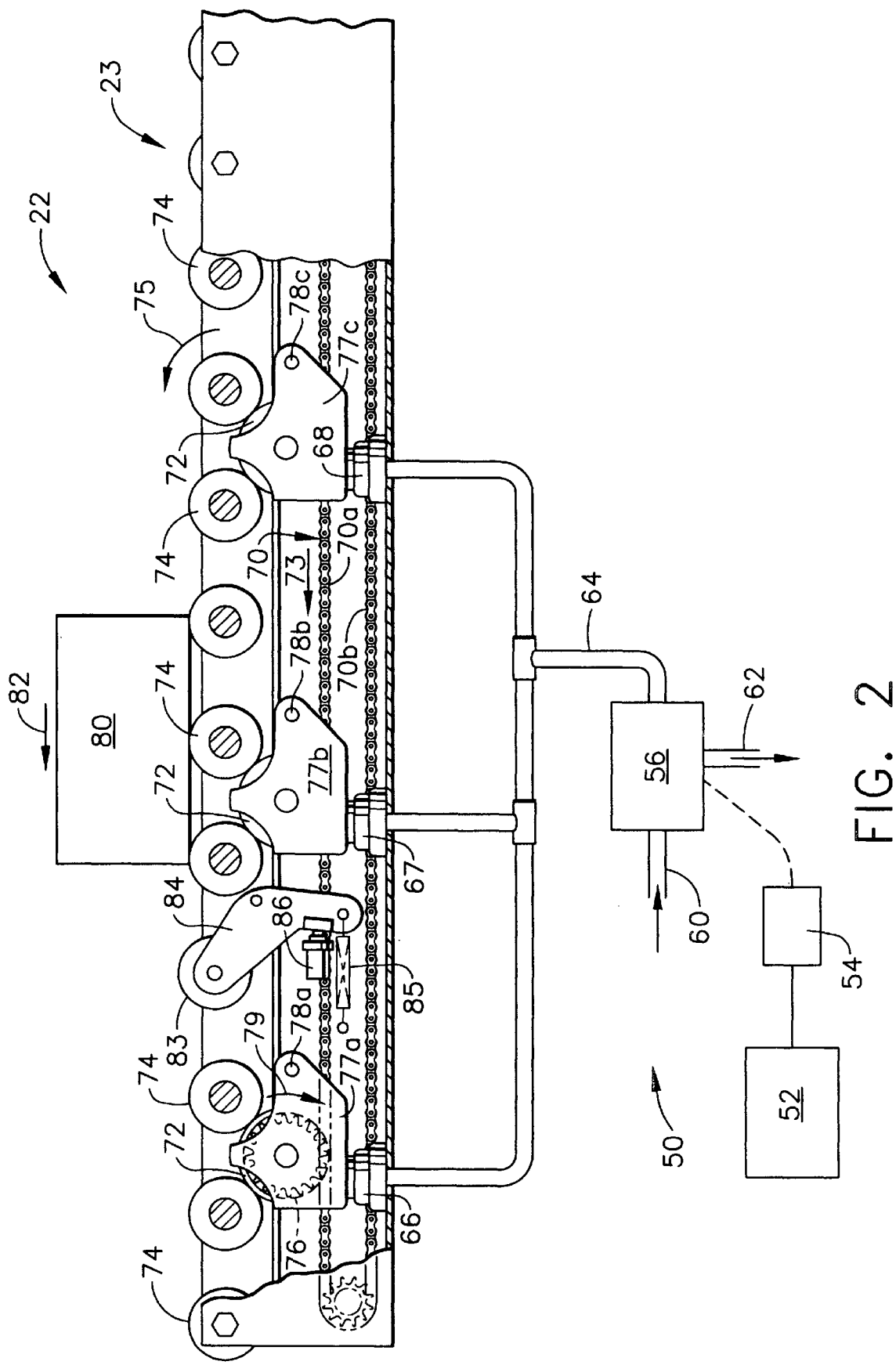

In FIG. 1a, an overall conveyor system is generally indicated at 10. An exemplary constant speed accumulating conveyor is generally indicated at 20. As is well known in the art, the accumulating conveyor is made up of a plurality of zones, the number of which does not constitute a limitation of the present invention. In FIG. 1a, three zones of the accumulating conveyor 20 are shown generally at 22, 23 and 24, with another zone partially shown at 25. The endmost zone 22, which discharges products (not shown) onto the downstream receiving conveyor 30, is frequently referred to as the drop-out zone and will be referred to as the drop-out zone throughout the specification and claims. In most instances, the zones of the accumulating conveyor are of substantially equal length. While not so limited, the usual length of the zones falls within the range of from about 18 inches to about 72 inches.

As will be understood by one skilled in the art, the nature of the conveyor which receives product such as cartons from the accumulating conveyor 20 does not constitute a limitation of the present invention. The receiving conveyor 30 could be a roller conveyor, a belt conveyor, another accumulating conveyor, or the like. For the present invention to be effective, the receiving conveyor 30 must have an effective receiving velocity less than the velocity of accumulating conveyor 20 so that the present invention can provide its rate matching capabilities.

While not intended to be limiting, for purposes of an exemplary showing, the receiving conveyor 30 is illustrated as a belt conveyor and will hereinafter be referred to as the downstream conveyor. In the non-limiting example set forth in FIGS. 1a and 1b, the downstream conveyor 30 is followed by a servo motor driven belt conveyor 40, hereinafter referred to as the servo conveyor. Downstream conveyor 30 and servo conveyor 40 are coupled by a power take-off 45 such that servo conveyor 40 runs at a faster velocity than downstream conveyor 30 and the velocities of servo conveyor 40 and downstream conveyor 30 bear a specific ratio relationship to each other by virtue of power take-off 45. One exemplary ratio of velocities between servo belt conveyor 40 and downstream conveyor 30 is 5:3.

Returning to the accumulating conveyor 20, the overall conveyor is provided with a constant speed prime mover (described hereinafter) which drives an individual roller drive mechanism for each zone of the accumulating conveyor 20. The roller drive mechanism for drop-out zone 22 is illustrated in FIG. 2. The rollers 74 of drop-out zone 22 are intended to be rotated in the direction shown by arrow 75. When this occurs, a product such as a carton 80 is fed along the drop-out zone conveyor section 22 in the direction of arrow 82. The velocity of carton 80 will be controlled by the velocity of rollers 74 as they rotate in the direction of arrow 75.

Selected ones of rollers 74 are driven by friction wheels 72. Each friction wheel 72 has an integral sprocket wheel associated therewith. One such sprocket wheel is shown in broken lines at 76. The friction wheels 72 and their respective sprocket wheels 76 are rotatively mounted in housings 77a, 77b and 77c, pivotally affixed to the conveyor main frame as at 78a, 78b and 78c.

The overall accumulating conveyor 20 is provided with a constant speed prime mover means comprising an appropriate prime mover (not shown) driving a drive chain which extends substantially the length of accumulating conveyor 20. The drive chain is generally indicated at 70 and has an upper flight 70a which passes through each of the housings 77a, 77b and 77c and engages the sprocket wheels 76 therein so as to drive friction wheels 72. The return flight of drive chain 70 is shown at 70b. The upper flight of drive chain 70 moves in the direction of arrow 73, causing friction wheels 72 to rotate in the direction of arrow 79. It will be understood that whenever the prime mover and drive chain 70 are operating, the friction wheels 72 will be rotating.

Each of the housings 77a, 77b and 77c are pivotable about pivot shafts 78a, 78b and 78c between an upper position wherein their respective friction wheels 72 contact and rotate the adjacent conveyor rollers 74 (as shown in FIG. 2) and a lower position wherein their respective friction wheels 72 are spaced from the adjacent conveyor rollers 74.

The overall control system for the drive mechanism drop-out zone 22 is generally indicated at 50. The control system comprises a series of three diaphragms 66, 67 and 68 by which housings 77a, 77b and 77c, respectively, are pivoted between their upper driving positions and their lower non-driving positions. These diaphragms operate on pressurized air, typically having a supply pressure in the range of from about 6 to about 15 pounds per square inch. The pressurized air is controlled by a valve 56 which, in the illustrated embodiment, is a standard three-way valve. The pressurized air supply (preferably pressurized to a constant value in the range of 6 to 15 PSI) is supplied through a conduit or hose 60. Valve 56 either switches the diaphragms 66, 67 and 68 through conduit or hose 64 to the air supply, or switches them to an exit line 62 (which typically may be an exhaust line).

Valve 56 is typically controlled by some type of electrical switching device, such as a solid-state relay or perhaps even an electromechanical relay. In the present invention, it is preferred that the switching device be some type of solid-state device, because there will be relatively frequent on/off transitions in the electrical power signal that is provided to valve 56. In the illustrated embodiment of FIG. 2, a computer (or a programmable logic controller), generally designated by the index numeral 52, controls the logical processes that decide when to turn on or off valve 56. Computer 52 preferably contains a processing circuit that operates according to a software program that defines the necessary logical processes to perform the steps of the illustrated embodiment, and also contains sufficient memory and input/output devices to hold the software program and to communicate signals to and from other "field" devices.

Computer 52 supplies a signal to some type of electrical output switching device, generally designated by the index numeral 54. This output device would typically switch either a direct current signal or an alternating current signal in the range of 24 volts through 120 volts. The signal depends upon what type of valve is used for valve 56; one example would be a valve having a 120 VAC actuating coil, and in this situation, output device 54 would be a solid-state relay that has a low level logic input (which would be connected to computer 52), and a relatively high level 120 VAC output. The combination of computer 52, output device 54, and valve 56 make up a control system, generally designated by the index numeral 50, for the drop-out zone 22. Control system 50 has a capability of controlling the velocity of drop-out zone 22 between 0% and 100% of the full velocity of the accumulating conveyor 20. As related hereinabove, the principal task of control system 50 is to cause the drop-out zone 22 to run at a "desired release velocity," which is to match very closely the present velocity of the downstream conveyor 30. By periodically engaging the drive wheels 72 against the rollers 74, drop-out zone 22 effectively can be driven at a reduced rate, with no additional hardware required.

The other zones 23, 24, 25 (and others, if present) are each provided with a drive mechanism identical to that described with respect to the drop-out zone 22 and illustrated in FIG. 2. While an accumulating conveyor, such as conveyor 20 can be arranged in many different ways, an exemplary set up is such that when the prime mover and chain 70 are actuated, all of the rollers of those zones other than the drop-out zone will normally be contacted and driven by their respective drive mechanisms.

As is best shown in FIG. 1a, each of the zones is provided with a sensor roller mounted on a pair of rocker arms, one of which is shown at 83. The rocker arm 84 of each sensor roll 83 is urged by a tension spring 85 against the actuator of a valve 86. When a weight, such as carton 80, passes over sensor roller 83, the sensor roller arms, including arm 84 will be pivoted in such a way that it releases the actuator of its respective valve 86. When the valve is thus actuated, it will be disengage the drive mechanism of a selected upstream zone. This enables the accumulating conveyor 20 to perform its accumulating characteristics. In the exemplary conveyor system 10 of FIGS. 1 and 2, each sensor roller 83, when depressed, may cause the valve 56 of the next adjacent zone to connect the diaphragms to exhaust, disengaging its respective drive mechanism from the rollers of that zone for as long as the sensor roller 83 is depressed.

Figure 3:
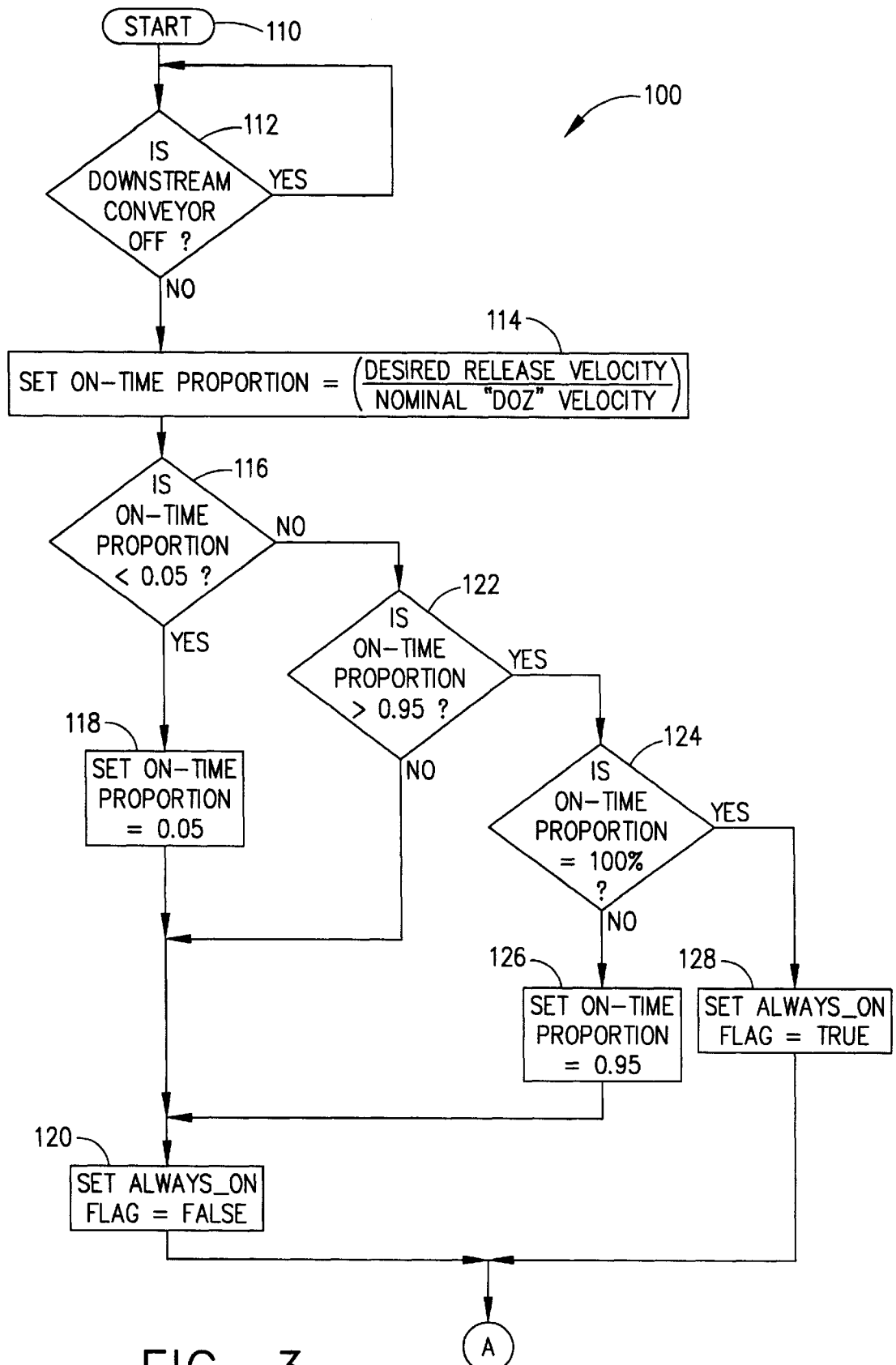
FIGS. 3, 4, and 5 constitute a flow chart depicting the logical operational steps involved in controlling the velocity of the drop-out zone of the conveyor in FIG. 2.

The operating logic that is found within computer 52 is described in FIGS. 3–5 as a flow chart 100, and is described in detail immediately below. The control logic of flow chart 100 describes the operational steps of the control system 50 for the drop-out zone, and begins at a "START" block designated by the index numeral 110. The logic flow travels to a decision block 112 which determines whether or not the downstream conveyor 30 is turned OFF. If the answer is YES, the logic flow merely loops back to the beginning of this decision block 112, and will continue to do so until the downstream conveyor 30 is turned ON. If the answer is NO, then the logic flow travels to the next function block 114.

At function block 114, the "ON-Time Proportion" is calculated from two values known to the overall conveyor system. These two values are the "Desired Release Velocity" and the "Nominal DOZ (drop-out zone) Velocity." As described hereinabove, the Nominal DOZ Velocity is equal to the nominal (or "full velocity") of the accumulating conveyor 20, which typically would also be the maximum possible velocity for the drop-out zone 22. The Desired Release Velocity is equal to the present velocity of the downstream conveyor 30. As related above, the velocity of downstream conveyor 30 is proportionally related to the velocity of the servo-driven belt conveyor 40 in the illustrated embodiment. If, for example, the belt conveyor 40 and downstream conveyor 30 are mostly empty of cartons, then the desired release velocity (from the drop-out zone 22 to the downstream conveyor 30) would likely be near or at full velocity of the accumulating conveyor 20. On the other hand, if the belt conveyor 40 and downstream conveyor 30 are nearly full of cartons, and the cartons are not being removed very quickly from the belt conveyor 40, then the Desired Release Velocity at the present time will likely be very slow, if not at zero (i.e., or STOP mode). As can be appreciated, the ON-Time Proportion will be equal to a value between 0 and 1.0 (or 100%, which would equal full velocity).

Now that the ON-Time Proportion has been determined, the logic flow is directed to a decision block 116, which determines if the ON-Time Proportion is less than 0.05. This ON-Time Proportion represents the "duty cycle" of the output signal from computer 52 to output device 54. The relatively low-level logic signal between computer 52 and output 54 will typically be a DC signal, such as zero volts for OFF, and five volts DC for ON. In the present invention, the preferred method for reducing the velocity of the rollers 74 is to actuate the valve 56 with a "pulse-width modulator" signal so as to energize the diaphragms for only a certain portion of time during repeated time intervals. The repeated time intervals will have a predetermined time period (i.e., the "period") which will have a corresponding "on-time" and "off-time". For example, if the on-time and off-time are equal in value, then the "duty cycle" will be 50%, and the corresponding ON-Time Proportion would be equal to 0.50. In this example, of course, the OFF-Time Proportion would also be equal to 0.50. As will be understood, the sum of the ON-Time Proportion and OFF-Time Proportion will always equal 1.00.

Since the three-way valve 56 and the diaphragms 66 and 68 each have a minimum reaction time, or "response time," before they can either actuate ON or actuate OFF, there is a minimum amount of time that the output signals from computer 52, and correspondingly from output device 54, must be fixed in either the ON-state or OFF-state before the mechanical system that engages the drive wheel 72 against the rollers 74 can possibly either turn ON or turn back OFF. This response time can be a first time interval for actuating the system ON, and can be a second time interval to de-actuate the system OFF. In the illustrated embodiment, it has been demonstrated that a suitable "minimum response time" for the ON-Time is approximately 0.18 seconds, and for the OFF-Time is also 0.18 seconds. It will be understood that, for different models of air valves and/or diaphragms, the minimum response times would likely be time intervals other than 0.18 seconds, and that the illustrated conveyor system can properly operate with other values of minimum response times without departing from the principles of the present invention.

Given that a particular minimum response time is required to actuate the engagement or disengagement of the drive wheel 72 against roller 74, it will be understood that there is no point in having an "ON-Time" interval less than 0.18 seconds in the illustrated embodiment, because a shorter pulse time period would not properly actuate the system, and drive wheel 72 would never engage the roller 74. Similarly, it will be understood that, given that there is a minimum response OFF-Time, there is no point in having an OFF-Time interval that is less than 0.18 seconds, because a shorter "off" pulse time interval would not allow the drive wheel 72 to become disengaged from the roller 74 before the system became re-engaged. These concepts are elegantly handled by the control logic for the present invention, as will be described in detail below.

If the decision made by decision block 116 is YES, then a function block 118 will set the ON-Time Proportion to 0.05. After that has occurred, the logic flow is directed to a function block 120 that sets the "ALWAYS_ON FLAG" equal to FALSE. It will be understood that the ALWAYS_ON FLAG is turned on only when the duty cycle of the signal leaving computer 52 is to be at 100%.

If the result is NO at decision block 116, then the logic flow arrives at another decision block 122 which determines whether or not the ON-Time Proportion is greater than 0.95. If the answer is NO, then the logic flow is directed to function block 120, where the ALWAYS_ON FLAG is set to FALSE.

If the ON-Time Proportion is greater than 0.95, the logic flow is directed to a decision block 124 that determines whether or not the ON-Time Proportion is equal to 100%. If the answer is YES, the logic flow is directed to a function block 128 that sets the ALWAYS_ON FLAG equal to a TRUE value. In this case, it will be understood that this ALWAYS_ON FLAG merely signifies that the servo-driven belt conveyor 40 is running at a sufficient pace that it requires the drop-out zone 22 to be continuously running at full velocity.

If the result at decision block 124 is NO, the logic flow arrives at a function block 126 that sets the ON-Time Proportion equal to 0.95. After that occurs, the logic flow is directed to function block 120, which sets the ALWAYS_ON FLAG equal to FALSE. In all cases, the logic flow now arrives at the letter "A", which then directs the logic flow to FIG. 4. At this time, the ON-Time Proportion is known, the state of the ALWAYS_ON FLAG is known, and if the ON-Time Proportion is either less than 0.05 or greater than 0.95, then this ON-Time Proportion value is artificially set to a minimum of 0.05 or a maximum of 0.95. This last feature of the illustrated embodiment is merely an optional feature to improve the responsiveness of the drop-out zone 22, and this will be explained in greater detail below. It will be understood that these artificial limits of a minimum of 0.05 and a maximum of 0.95 for the ON-Time Proportion could be easily discarded or set to other values, such as 10% and 90%, or values closer to the 0 and 100% end-scale values, without departing from the principles of the present invention.

Figure 4:
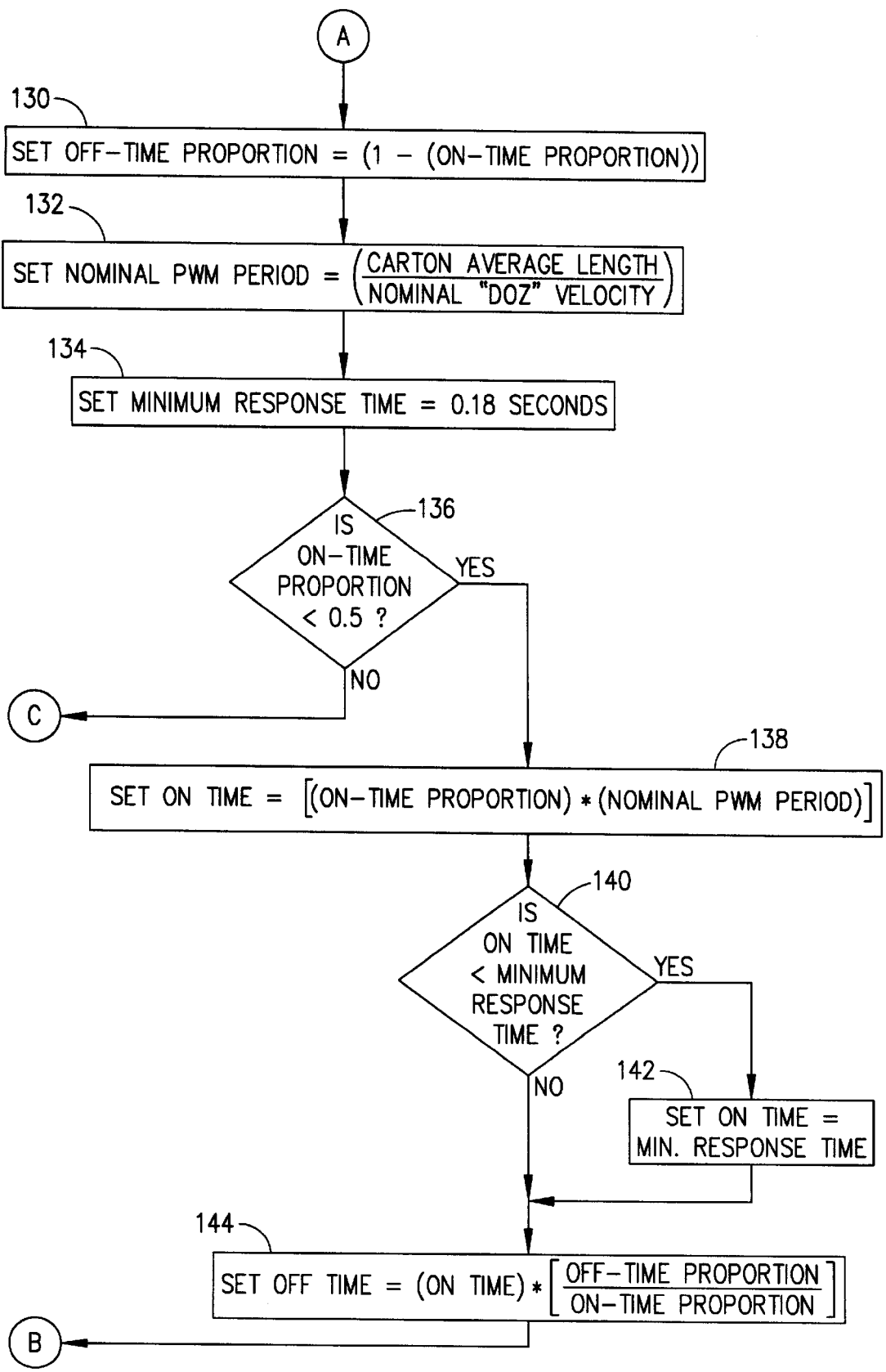

The logic flow now arrives at FIG. 4, and is directed to a function block 130 which determines the OFF-Time Proportion. As was related above, the OFF-Time Proportion summed with the ON-Time Proportion will equal 1.00, and therefore, the equation for the OFF-Time Proportion is equal to 1.00 minus ON-Time Proportion. A function block 132 now will determine the "Nominal PWM Period," which represents the preferred period of time at which the pulse-width modulator aspect of this invention repeatedly will operate. In the flow chart 100, this nominal PWM Period is equal to the quantity {["Carton Average Length"] divided by ["Nominal DOZ Velocity"]}. In one illustrative example, the Nominal DOZ Velocity is equal to 210 feet per minute, and the average length of a carton handled by conveyor system 10 is 24 inches in length. The calculation of {24 inches divided by 210 feet per minute} is equal to 0.57 seconds, which is equal to the length of time that the carton will require to pass over a particular point along accumulating conveyor 20. It will be understood that a shorter or longer time interval for this period could be chosen without departing from the principles of the present invention. It is preferred, however, that the system have a short enough nominal PWM period so that the system is responsive enough so that it can react within the time it takes one carton to pass a single point of the conveyor. This is by no means a requirement, but is merely a recommended principle of operation.

The logic flow now arrives at a function block 134 which sets the minimum response time equal to 0.18 seconds. The reason for selecting this particular time value was described above.

The logic flow now arrives at a decision block 136 which determines whether or not the ON-Time Proportion is less than 0.5. If the answer is NO, the logic flow is directed to the letter "C" (and then onto FIG. 5), which means that the OFF-Time Proportion is less than the ON-Time Proportion. If the answer is YES, the logic flow is directed to a function block 138.

At function block 138, the ON-Time is set to a value equal to the quantity {[ON-Time Proportion] times [Nominal PWM Period]}. If, for example, the Nominal PWM Period is equal to 0.57 seconds, and the ON-Time Proportion is equal to 0.40 (i.e., a 40% duty cycle), then the ON-Time value would be calculated as 0.228 seconds. The logic flow is now directed to a decision block 140 which determines whether or not the ON-Time is less than the Minimum Response Time. Since the Minimum Response Time was previously set to 0.18 seconds (see function block 134), this comparison at decision block 140 will determine whether or not the ON-Time is less than 0.18 seconds. If the answer is YES, the logic flow is directed to a function block 142 that sets the ON-Time equal to the minimum response time (i.e., 0.18 seconds). The logic flow then travels to a function block 144, where the OFF-Time value is determined.

If the result at decision block 140 is NO, the logic flow also arrives at function block 144, however, in this instance, the ON-Time is not artificially set to the minimum response time value of 0.18 seconds.

Function block 144 calculates the OFF-Time as being equal to the value of [ON-Time] times the quantity {[OFF-Time Proportion] divided by [ON-Time Proportion]}. If we inspect the previous example, where the ON-Time was equal to 0.228 seconds and the nominal PWM period was equal to 0.57 seconds, then the OFF-Time would be set to 0.342 seconds (which represents 60% of the nominal PWM period). The logic flow now arrives at a letter "B", and the logic flow now is directed on to FIG. 5.

Figure 5:
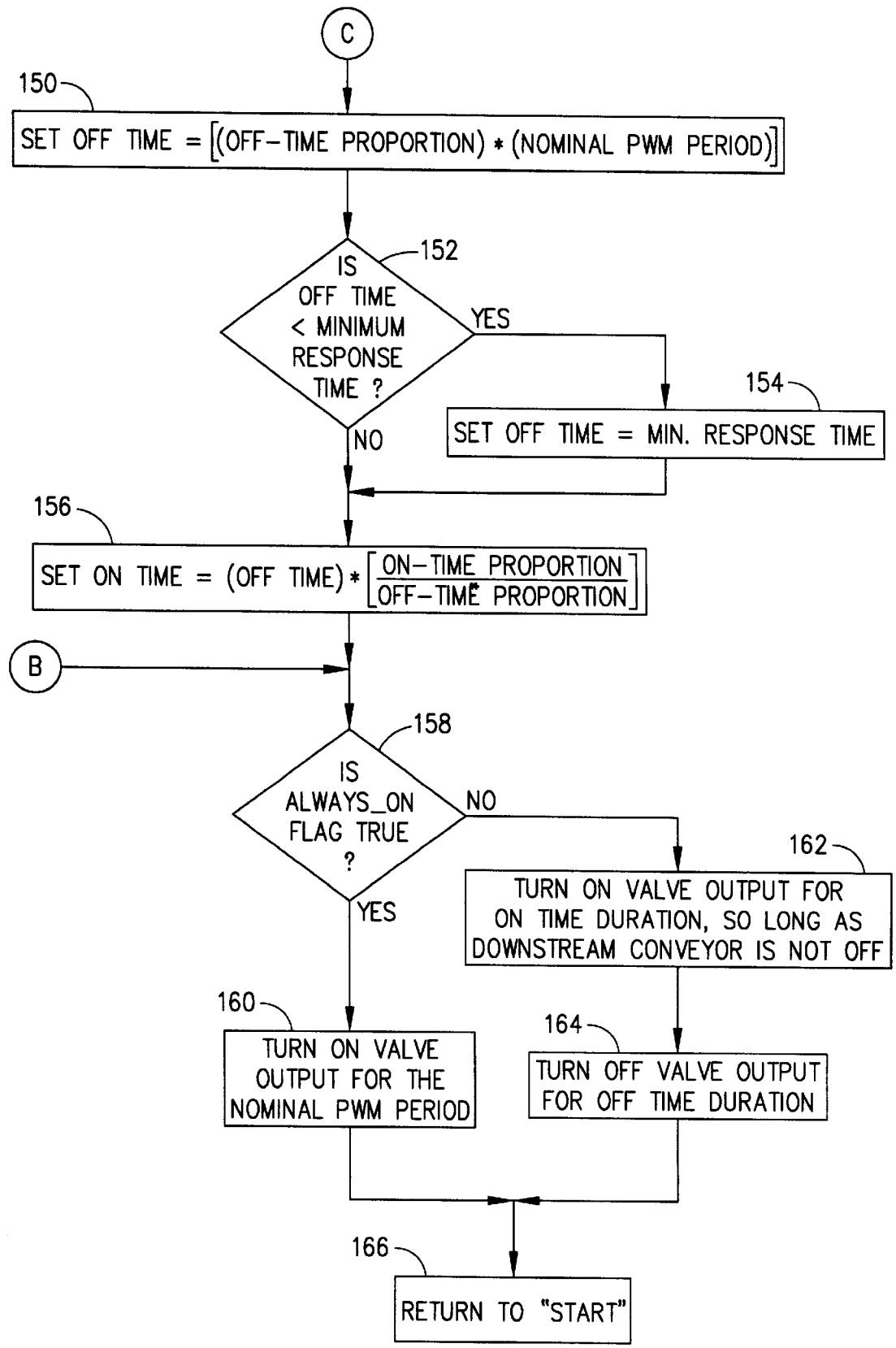

On FIG. 5, the logic flow is directed from "C" to a function block 150, where the OFF-Time is determined. To arrive at this part of flow chart 100, the logic flow would have had to bypass the function blocks 138 and 144 where the ON-Time and OFF-Time quantities are calculated. In this instance, decision block 136 determined that the ON-Time proportion was greater than 0.5, which means that the OFF-Time is less than the ON-Time. Since we cannot allow either the ON-Time or OFF-Time to be less than 0.18 seconds (i.e., the minimum response time of the system), the logical operations of the control system 50 must also concern itself with controlling the minimum OFF-Time, which also would be associated with a certain maximum duty cycle before the Nominal PWM Period must be either increased or decreased.

At function block 150, the OFF-Time is calculated as being equal to the quantity {[OFF-Time Proportion] times [Nominal PWM-Period]}. The logic flow now arrives at a decision block 152 which determines whether or not the OFF-Time is less than the minimum response time. If the answer is YES, then the logic flow is directed to a function block 154 that sets the OFF-Time equal to the minimum response time value (i.e., 0.18 seconds). After that occurs, the logic flow arrives at a function block 156 which then sets the ON-Time. If the answer was NO at decision block 152, then the logic flow directly arrives at function block 156 to set the ON-Time. In this second circumstance, the OFF-Time has not been artificially forced to be equal to the minimum response time.

At decision block 156, the ON-Time is calculated to be equal to the value of the [OFF-Time] times the quantity {[ON-Time Proportion] divided by [OFF-Time Proportion]}. For example, if the duty cycle increased to 75%, the OFF-Time Proportion would be equal to 0.25. If the Nominal PWM Period remained at 0.57 seconds, then the corresponding OFF-Time would be equal to 0.143 seconds, which is less than the Minimum Response Time. Therefore, the time period for the Nominal PWM Period must be increased to 0.72 seconds, thereby allowing the OFFTime interval to be 0.18 (which is equal to the Minimum Response Time), while keeping the duty cycle at 75% (and the ON-Time would become 0.54 seconds).

The logic flow is now directed to a decision block 158, whether the logic flow comes from function block 156, or from function block 144 on FIG. 4, via the letter "B". Decision block 158 detects whether or not the ALWAYS__ ON FLAG state is TRUE or FALSE. If the ALWAYS__ON FLAG state is TRUE, the logic flow arrives at a function block 160 which turns on the valve output (at computer 52, and correspondingly at output device 54) for the Nominal PWM Period. In this condition, the duty cycle is to be at 100%, however, control system 50 does not merely turn the valve 56 ON all the time for long periods with no other control operations executing. Instead, the control system 50 will be cycling through all of the logical operational steps very quickly in a repeated fashion, so as to alter the duty cycle as needed according to the system requirements. Accordingly, the logic flow is directed to a function block 166 that returns the logic flow to the START block 110 (on FIG. 3).

If decision block 158 determines that the ALWAYS__ON FLAG is set to FALSE, the logic flow is directed to a function block 162 which turns on the valve output (at output device 54) for the ON-Time duration, so long as the downstream conveyor 30 is not turned OFF. It will be understood that it is preferred that control system 50 includes a computer 52 that is multitasking in nature, and can run a separate task to repeatedly inspect the status of the downstream conveyor 30. If the downstream conveyor 30 suddenly turns OFF, and if function block is attempting to turn the valve output ON for the On-Time duration, then it is desirable to interrupt that ON or energized state of valve 56, so as to turn that valve OFF immediately. This multitasking operational decision is not depicted explicitly on flow chart 100, except for the language of function block 162. It will be understood that the methodology of implementing such decisions concerning the operating conditions of other conveyors can be implemented in many different ways without departing from the principles of the present invention.

The logic flow now arrives at a function block 164 which turns the valve output off (i.e., at output device 54) for the OFF-Time duration, immediately following the ON-Time duration for this same valve output. After that has occurred, the logic flow is directed to the function block 166, after which the logic operational steps begin all over again at START block 110.

An example of a conveyor system design that could benefit from the principles of the present invention would be an accumulating conveyor 20 having a nominal speed selected as 210 feet per minute (fpm), a servo-driven belt conveyor 40 having a full speed of 350 fpm, a power take-off 45 ratio of 5:3, thereby providing a full speed for the downstream conveyor 30 of 210 fpm. In a conventional system, the drop-out zone 22 would also run at the accumulating conveyor's nominal speed of 210 fpm, or it would be turned completely off. When belt conveyor 40 runs at full speed (i.e., 350 fpm), then the "release velocity" of the drop-out zone 22 would be equal to the downstream conveyor's velocity of 210 fpm, which is completely desirable.

However, in a conventional system, when the belt conveyor 40 runs at a lower speed, the drop-out zone 22 will run at a velocity greater than that of the downstream conveyor 30, which will ultimately lead to an undesirable situation of a greater density of packages accumulating on belt conveyor 40 and downstream conveyor 30, and which will ultimately cause the cartons to buckle and skew. For example, the belt conveyor 40 could drop to half speed (i.e., 175 fpm), which would cause the downstream conveyor 30 to drop to its corresponding half speed (i.e., 105 fpm), while the accumulating conveyor 20 and its drop-out zone keeps running at their full speeds of 210 fpm. As cartons leave conveyor 20 at 210 fpm and push onto conveyor 30 at 105 fpm there is a build-up of pressure between the cartons. This pressure is ultimately relieved when the cartons slip on their conveyors 20 and 30. Prior to reaching the slipping point, the pressure causes cartons to twist and turn and pop-out (becoming side-by-side rather than remaining in single file).

By use of the control system of the present invention, the above example could be converted into a situation where the desired release velocity from the drop-out zone 22 always substantially matches the actual velocity of the downstream conveyor 30. When belt conveyor 40 runs at full speed of 350 fpm, the accumulating conveyor 20 runs at 210 fpm, its drop-out zone runs at 210 fpm, and the downstream conveyor 30 runs at 210 fpm. This provides the desired matching velocities between the dropout zone and the downstream conveyor. When the belt conveyor drops to a half-speed of 175 fpm, the accumulating conveyor 20 continues to run at 210 fpm, however, both the downstream conveyor 30 and the drop-out zone 22 now run at 105 fpm, and therefore, continue to (desirably) match their velocities, thereby preventing pressure build-up between cartons.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodi- It is claimed:

1. A control system for a conveyor system having a first conveyor with a drop-out zone, a drive mechanism for said drop-out zone, a second downstream variable-speed conveyor, and an actuator that operates said drive mechanism for said drop-out zone, wherein:

(a) said first conveyor's drop-out zone comprising a plurality of rollers over which packages move, said rollers being selectively driven by said drive mechanism operated by said actuator so as to induce rotational movement in said rollers (b) said control system having a processing circuit that is configured to determine the velocity of said second, downstream conveyor, said processing circuit being additionally configured to determine the effective velocity of said first conveyor's drop-out zone by use of a periodic varying duty cycle signal that controls said actuator via an output device that is in communication with said processing circuit; and (c) said processing circuit being further configured to vary the ON-time and OFF-time of said varying duty cycle signal to automatically control energizing said output device so as to substantially match the velocity of said first conveyor's drop-out zone to the velocity of said second, downstream conveyor.

2. The control system as recited in claim 1, wherein said first conveyor comprises an accumulating conveyor.

3. The control system as recited in claim 1, wherein said first conveyor comprises at least two zones, one of which comprises said drop-out zone, said first conveyor having a constant-speed prime mover that drives individual drive mechanisms for each of said zones; and wherein said effective velocity of said first conveyor's drop-out zone is variable between 0% and 100% of said constant velocity by varying the duty cycle of said varying duty cycle signal so that said drive mechanism for the drop-out zone engages said rollers only during said ON-time of each period of said varying duty cycle signal that controls said actuator.

4. The control system as recited in claim 3, wherein said first conveyor comprises an accumulating conveyor.

5. The control system as recited in claim 1, wherein said drive mechanism comprises a plurality of friction wheels shiftable between a roller contacting and driving position and a retracted position, and wherein said actuator comprises at least one air-powered diaphragm, an air valve, and an electrical switching device, said electrical switching device energizing said air valve to activate said at least one diaphragm to shift said drive mechanism to said roller contacting and driving position during said ON-time and de-energizing said air valve during said OFF-time to de-activate said diaphragm and shift said drive mechanism to said retracted position during each period of said varying duty cycle signal produced by said processing circuit.

6. The control system as recited in claim 5, wherein said varying duty cycle signal produced by said processing circuit is a first direct current electrical signal, and said electrical switching device energizes said air valve with a second direct current electrical signal.

7. The control system as recited in claim 5, wherein said varying duty cycle signal produced by said processing circuit is a direct current electrical signal, and said electrical switching device energizes said air valve with an alternating current electrical signal.

8. The control system as recited in claim 1, wherein said processing circuit is further configured to limit said ON-time to a minimum ON-time interval and to limit said OFF-time to a minimum OFF-time interval, and to lengthen the period of said periodic varying duty cycle signal in circumstances where said ON-time would otherwise be shorter in time duration than said minimum ON-time interval, and where said OFF-time would otherwise be shorter in time duration than said minimum OFF-time interval.

9. The control system as recited in claim 8, wherein said ON-time minimum time interval is equal to said OFF-time minimum time interval.

10. The control system as recited in claim 8, wherein said ON-time minimum time interval is not equal to said OFF-time minimum time interval.

11. A method for varying the velocity of a drop-out zone in a conveyor system having a conveyor with a drop-out zone, a drive mechanism for said drop-out zone, a downstream variable-speed conveyor, a control system having a processing circuit, and an actuator that operates the drive mechanism for the drop-out zone, said method comprising the steps of:

(a) determining the desired effective operating velocity of a drop-out zone of a first conveyor, said first conveyor having at least two zones and a constant-speed prime mover that drives individual drive mechanisms for each of said zones;

(b) determining the operating velocity of a second, downstream variable-speed conveyor;

(c) providing a periodic varying duty cycle signal that exhibits a variable ON-time and OFF-time, via a control system having a processing circuit;

(d) driving an actuator that engages the individual drive mechanism for said drop-out zone for only the ON-time portion of each period of said periodic varying duty cycle signal, thereby providing said drop-out zone with an effective variable-speed capability; and (e) substantially matching the velocity of said second conveyor's drop-out zone to the velocity of said first, downstream conveyor.

12. The method as recited in claim 11, wherein said actuator comprises at least one air-powered diaphragm, an air valve, and an electrical switching device, and further comprising the steps of said electrical switching device energizing said air valve during said ON-time and de-energizing said air valve during said OFF-time during each period of said varying duty cycle signal.

13. The method as recited in claim 11, wherein said first conveyor comprises an accumulating conveyor.

14. The method as recited in claim 11, further comprising the steps of limiting said ON-time to a minimum ON-time interval and limiting said OFF-time to a minimum OFF-time interval, and lengthening the period of said periodic varying duty cycle signal in circumstances where said ON-time would otherwise be shorter in time duration than said minimum ON-time interval, and where said OFF-time would otherwise be shorter in time duration than said minimum OFF-time interval.

15. The method as recited in claim 14, wherein said ON-time minimum time interval is equal to said OFF-time minimum time interval.

16. The method as recited in claim 14, wherein said ON-time minimum time interval is not equal to said OFF-time minimum time interval.

* * * * *